United States Patent [19]
Kato

[11] Patent Number: 5,943,915
[45] Date of Patent: Aug. 31, 1999

[54] TWO-DIMENSIONAL MOTION PRODUCING APPARATUS

[75] Inventor: Heizaburo Kato, Shizuoka, Japan

[73] Assignee: Sankyo Manufacturing Co., Inc., Tokyo, Japan

[21] Appl. No.: 08/964,698

[22] Filed: Nov. 6, 1997

[30] Foreign Application Priority Data

Nov. 11, 1996 [JP] Japan .................................. 8-298956

[51] Int. Cl.⁶ .......................... G05G 11/00; A47B 85/00; A47B 11/00
[52] U.S. Cl. .......................... 74/490.09; 108/20; 108/137
[58] Field of Search .............................. 74/490.09, 84 R; 108/20, 22, 137, 143; 83/35, 36, 404, 437.1, 437.6; 269/55, 56, 57, 73, 60, 61

[56] References Cited

U.S. PATENT DOCUMENTS

| | | | |
|---|---|---|---|
| 4,155,272 | 5/1979 | Mosher | 74/490.09 |
| 4,409,860 | 10/1983 | Moriyama et al. | 74/490.09 |
| 5,309,847 | 5/1994 | Matsumoto | 74/490.09 X |
| 5,613,403 | 3/1997 | Takei | 74/490.09 |

FOREIGN PATENT DOCUMENTS 49-42752 11/1974 Japan .
6-16365 4/1994 Japan .

*Primary Examiner*—John A. Jeffery
*Assistant Examiner*—Brandon C. Stallman
*Attorney, Agent, or Firm*—Morrison & Foerster

[57] ABSTRACT

The present invention relates to a two-dimensional motion producing apparatus for converting rotation of an input shaft to a two-dimensional motion in an X-direction of an output member and in an Y-direction orthogonal thereto. This apparatus of the present invention is constituted by an input shaft being input a rotational motion; an output member provided movably in a two-dimensional direction; a first guide groove elongated in the X-direction on the output member; a second and a third guide grooves elongated in the Y-direction spaced apart from each other on the output member; a first, a second and a third rocking arms engaged in the first guide groove and the second and third guide grooves respectively through engaging members; a first rocking conversion mechanism for converting the rotation of the input shaft into the rocking motion of the first rocking arm; and a second and a third rocking conversion mechanisms for converting the rotation of the input shaft into the rocking motions in synchronism with each other of the second and third rocking arms. The number of constituent parts for producing the motion can be reduced, whereby the durability of the two-dimensional motion producing apparatus can be materially enhanced.

7 Claims, 10 Drawing Sheets

TWO-DIMENSIONAL MOTION PRODUCING APPARATUS

BACKGROUND OF THE INVENTION

1. Field of the Invention

The present invention relates to a two-dimensional motion producing apparatus for converting rotation of an input shaft to a two-dimensional motion in an X-direction of an output member and in an Y-direction orthogonal thereto.

2. Description of the Related Art

A conventional two-dimensional motion producing apparatus so far known is disclosed, for example, in Japanese Utility Model Publication No. Heisei 6-16365 (Int. Cl. G12B 5/00). This conventional apparatus is provided with two drive motors. This apparatus is constituted by a first arm provided on a rotational shaft of one drive motor, a second arm, a connecting plate and a first rail constituting a parallel crank mechanism together with the first arm, first and second sliders slidably provided on the first rail, a third arm provided on a rotational shaft of the other drive motor, and a second rail slidably mounted on a third slider provided on the third arm. The second rail is arranged at right angles to the first rail. The first and second sliders and the second rail are secured to a table as an output member.

One drive motor is driven to rotate the first arm whereby a moving force is applied to the table through the parallel crank mechanism so that the table is guided by the second rail and the third slider and moved linearly in the X-direction. On the other hand, the other drive motor is driven to rotate the third arm so that the table is guided by the first rail and the first and second sliders and moved linearly in the Y-direction. Accordingly, the two drive motors are driven so that the table can be moved linearly in the two-dimensional directions of X and Y.

However, in the conventional two-dimensional motion producing apparatus as described, it is necessary to provide two drive motors as drive sources. Further, in the conversion of the rotation of these drive motors to the movement in the two-dimensional direction of the table, it is necessary that the parallel crank mechanism constituted by a plurality of members such as the first arm, the second arm, the connecting plate and the first rail is connected to one drive motor. Further it is necessary to provide the first and second sliders for mounting the first rail on the table. On the other hand, in the other drive motor, it is necessary to provide the third arm, the third slider and the second rail mounted on the table.

Accordingly, the above-described conventional apparatus had various problems. Namely, it must have two drive sources. Very many constituent parts are required to convert from the rotation of the drive sources to the movement of the table in the two-dimensional direction. The construction is complicated, so there are many causes of occurrence of trouble so that it may deteriorate the durability. Since there involves the operation of the parallel crank mechanism, the high-speed operation of the apparatus is difficult to achieve.

SUMMARY OF THE INVENTION

In view of the problems noted above with respect to the conventional two-dimensional motion producing apparatus, an object of the present invention is to provide a two-dimensional motion producing apparatus in which a rotational motion of a single drive source can be converted to motions in a two-dimensional direction, and the constitution of the apparatus enabling such a conversion is simplified to provide a high durability and high speed operation.

For achieving the aforementioned object, a two-dimensional motion producing apparatus according to the present invention comprises an input shaft into which a rotation force is input, an output member provided movably in a two-dimensional direction of an X-direction and a Y-direction orthogonal thereto on a slide base surface, a first guide groove elongated in the X-direction on the output member, a second and a third guide grooves elongated in the Y-direction spaced apart from each other on the output member, a first, a second and a third rocking arms engaged in the first guide groove and the second and third guide grooves respectively through engaging members, a first rocking conversion mechanism for converting the rotation of the input shaft into the rocking motion of the first rocking arm, and a second and a third rocking conversion mechanisms for converting the rotation of the input shaft into the rocking motions in synchronism with each other of the second and third rocking arms.

The second and third guide grooves may be formed continuously in series with each other.

Further, the first rocking conversion mechanism, and the second and third rocking conversion mechanisms are constituted by cam mechanisms comprising a first, a second and a third roller gear cams provided integrally rotatably on the input shaft and each formed in its outer peripheral surface with a taper rib having a predetermined geometrical curve, and a first, a second and a third follower turrets engaged with the taper ribs of the first, second and third roller gear cams through cam followers.

Furthermore, for rocking and rotating the first rocking arm, and the second and third rocking arms at different timings from each other, the taper rib of the first roller gear cam is formed in a different geometrical shape from those of the taper ribs of the second and third roller gear cams, and for rocking and rotating the second and third rocking arms in synchronism with each other and at the same rotational angle, the taper ribs of the second and third roller gear cams are arranged in the same geometrical shape and at the same rotational phase.

Further, the first rocking conversion mechanism, and one of the second and third rocking conversion mechanisms are constituted by cam mechanisms comprising a first and a second roller gear cams provided integrally rotatably on the input shaft and each formed in its outer peripheral surface with a taper rib having a predetermined geometrical curve, and a first and a second follower turrets engaged with the taper ribs of the first and second roller gear cams through cam followers, whereas the other of the second and third rocking conversion mechanisms is constituted by a gear mechanism in which a first and a second gears provided integrally rotatably on the second and third rocking arms are meshed with each other.

Preferably, the first and second gears are formed in a fan-shape with the smallest size capable of transmitting a rotational angle necessary for rocking rotation.

Further, a two-dimensional motion producing apparatus according to the present invention comprises an input shaft into which a rotation force is input, an output member provided movably in a two-dimensional direction of an X-direction and a Y-direction orthogonal thereto on a slide base surface, a first guide groove elongated in the X-direction on the output member, a second and a third guide grooves elongated in the Y-direction spaced apart from each other on the output member, a first, a second and a third rocking arms engaged in the first guide groove and the second and third guide grooves respectively through engaging members, a first rocking conversion mechanism for converting the rotation of the input shaft into the rocking motion of the first rocking arm, and a second and a third rocking conversion mechanisms for converting the rotation of the input shaft into the rocking motions in synchronism with each other of the second and third rocking arms; wherein the first rocking conversion mechanism, and the second and third rocking conversion mechanisms are constituted by cam mechanisms comprising a first, a second and a third roller gear cams provided integrally rotatably on the input shaft and each formed in its outer peripheral surface with a taper rib having a predetermined geometrical curve, and a first, a second and a third follower turrets engaged with the taper ribs of the first, second and third roller gear cams through cam followers; and, for rocking and rotating the first rocking arm, and the second and third rocking arms at different timings from each other, the taper rib of the first roller gear cam is formed in a different geometrical shape from those of the taper ribs of the second and third roller gear cams, and for rocking and rotating the second and third rocking arms in synchronism with each other and at the same rotational angle, the taper ribs of the second and third roller gear cams are arranged in the same geometrical shape and at the same rotational phase.

Further, a two-dimensional motion producing apparatus according to the present invention comprises an input shaft into which a rotation force is input, an output member provided movably in a two-dimensional direction of an X-direction and a Y-direction orthogonal thereto on a slide base surface, a first guide groove elongated in the X-direction on the output member, a second and a third guide grooves elongated in the Y-direction spaced apart from each other on the output member, a first, a second and a third rocking arms engaged in the first guide groove and the second and third guide grooves respectively through engaging members, a first rocking conversion mechanism for converting the rotation of the input shaft into the rocking motion of the first rocking arm, and a second and a third rocking conversion mechanisms for converting the rotation of the input shaft into the rocking motions in synchronism with each other of the second and third rocking arms; wherein the first rocking conversion mechanism, and one of the second and third rocking conversion mechanisms are constituted by cam mechanisms comprising a first and a second roller gear cams provided integrally rotatably on the input shaft and each formed in its outer peripheral surface with a taper rib having a predetermined geometrical curve, and a first and a second follower turrets engaged with the taper ribs of the first and second roller gear cams through cam followers, whereas the other of the second and third rocking conversion mechanisms is constituted by a gear mechanism in which a first and a second gears provided integrally rotatably on the second and third rocking arms are meshed with each other.

The operation of the two-dimensional motion producing apparatus according to the present invention will be explained below. In the two-dimensional motion producing apparatus according to the present invention, the rotation of the input shaft causes the first rocking arm to effect the rocking motion through the first rocking conversion mechanism and causes the second and third rocking arms to effect the rocking motion through the second and third rocking conversion mechanisms.

When the first rocking arm is subjected to the rocking motion, the engaging member of the first rocking arm causes the output member to tend to move on the slide base surface through the first guide groove. At this time, since the engaging members of the second and third rocking arms are respectively engaged with the second and third guide grooves formed spaced apart from each other, the output member is controlled in its moving direction by the engaging members in the second and third guide grooves, so that the output member is moved linearly in the Y-direction where the second and third guide grooves are elongated.

On the other hand, when the second and third rocking arms are synchronized and subjected to the rocking motion, the engaging members of the second and third rocking arms tend to move the output member on the slide base surface through the second and third guide grooves. At this time, since the second and third rocking arms are synchronized with each other at positions away from each other and subjected to the rocking motion, and the engaging member of the first rocking arm is engaged with the first guide groove, the output member is controlled in its moving direction by the engaging member in the first guide groove, so that the output member is linearly moved in the X-direction where the first guide groove is elongated.

Further, the first rocking conversion mechanism, and the second and third rocking conversion mechanisms are constituted by cam mechanisms comprising the first, second and third roller gear cams provided integrally rotatably on the input shaft and each formed in its outer peripheral surface with the taper rib having the predetermined geometrical curve, and the first, second and third follower turrets engaged with the taper ribs of the first, second and third roller gear cams through cam followers. Therefore, when the first, second and third roller gear cams are rotated by the rotation of the input shaft, the cam followers engaged with the taper ribs of the roller gear cams reciprocate around the first, second and third follower turrets along the geometrical curves of the taper ribs whereby the first, second and third follower turrets are oscillated rotationally. Accordingly, the first, second and third rocking arms are mounted on the rotational shafts of the first, second and third follower turrets whereby the rocking rotations of the follower turrets can be transmitted to the rocking arms.

Further, the first rocking conversion mechanism, and one of the second and third rocking conversion mechanisms are constituted by cam mechanisms comprising the first and second roller gear cams provided integrally rotatably on the input shaft and each formed in its outer peripheral surface with the taper rib having the predetermined geometrical curve, and the first and the second follower turrets engaged with the taper ribs of the first and second roller gear cams through cam followers. Therefore, the cam followers engaged with the taper ribs of the roller gear cams are reciprocated around the first and second follower turrets by the rotation of the input shaft to oscillate rotationally the first and second follower turrets, as mentioned previously. On the other hand, the other of the second and third rocking conversion mechanisms is constituted by the gear mechanism in which the first and second gears provided integrally rotatably on the second and third rocking arms are meshed with each other. Therefore, since the rocking rotation can be transmitted between the second rocking arm and the third rocking arm through the first gear and the second gear meshed with each other, the second and third rocking arms are synchronized with each other and oscillated rotationally in the reverse direction. As described above, also in the case where the second and third rocking arms are oscillated rotationally in the reverse direction, they are placed in synchronism with each other whereby the output member can be moved linearly in the X-direction on the slide base surface in a parallel state.

DETAILED DESCRIPTION OF THE PREFERRED EMBODIMENTS

Figure 1:
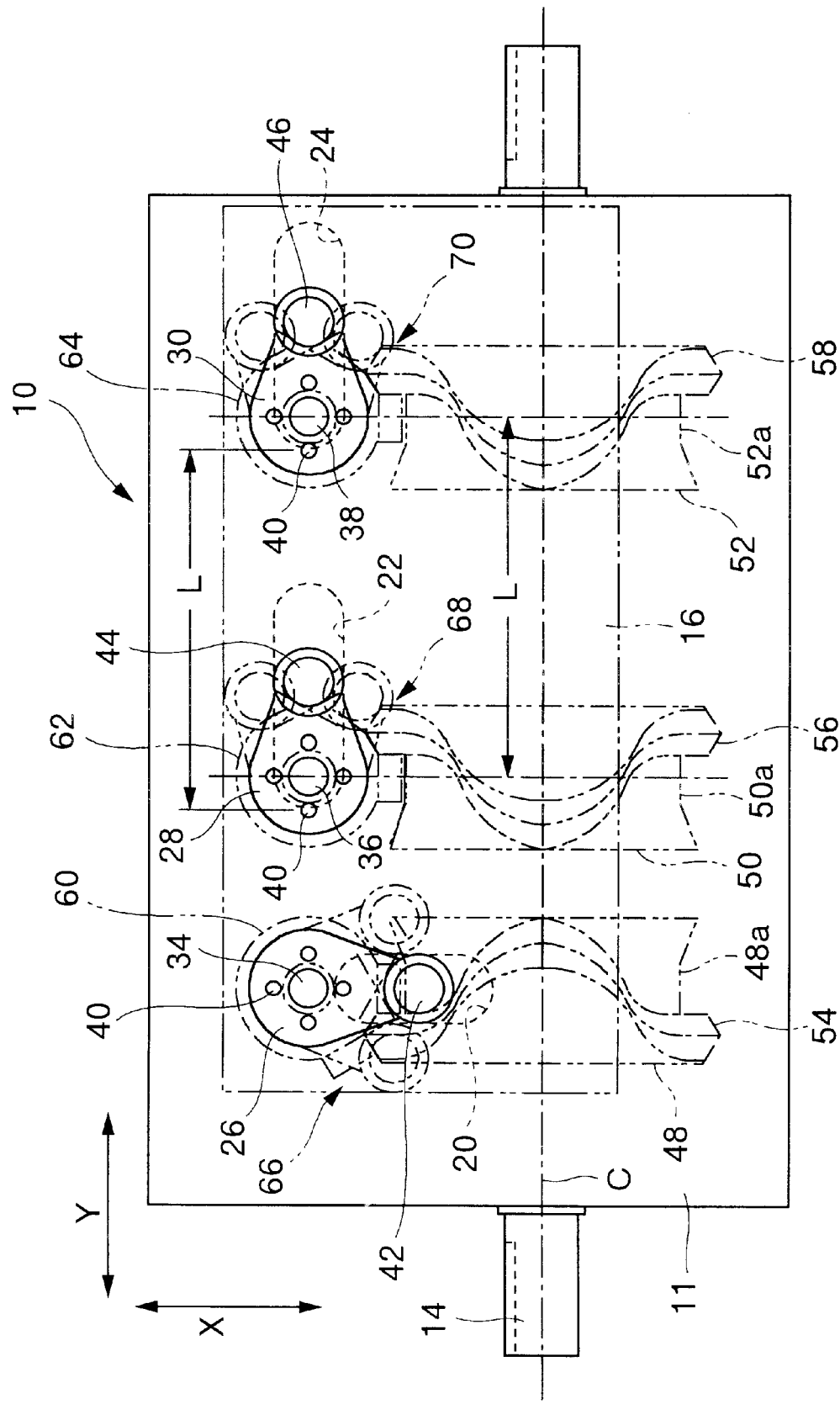
FIG. 1 is a plan view of a two-dimensional motion producing apparatus showing one embodiment of the present invention.
Figure 2:
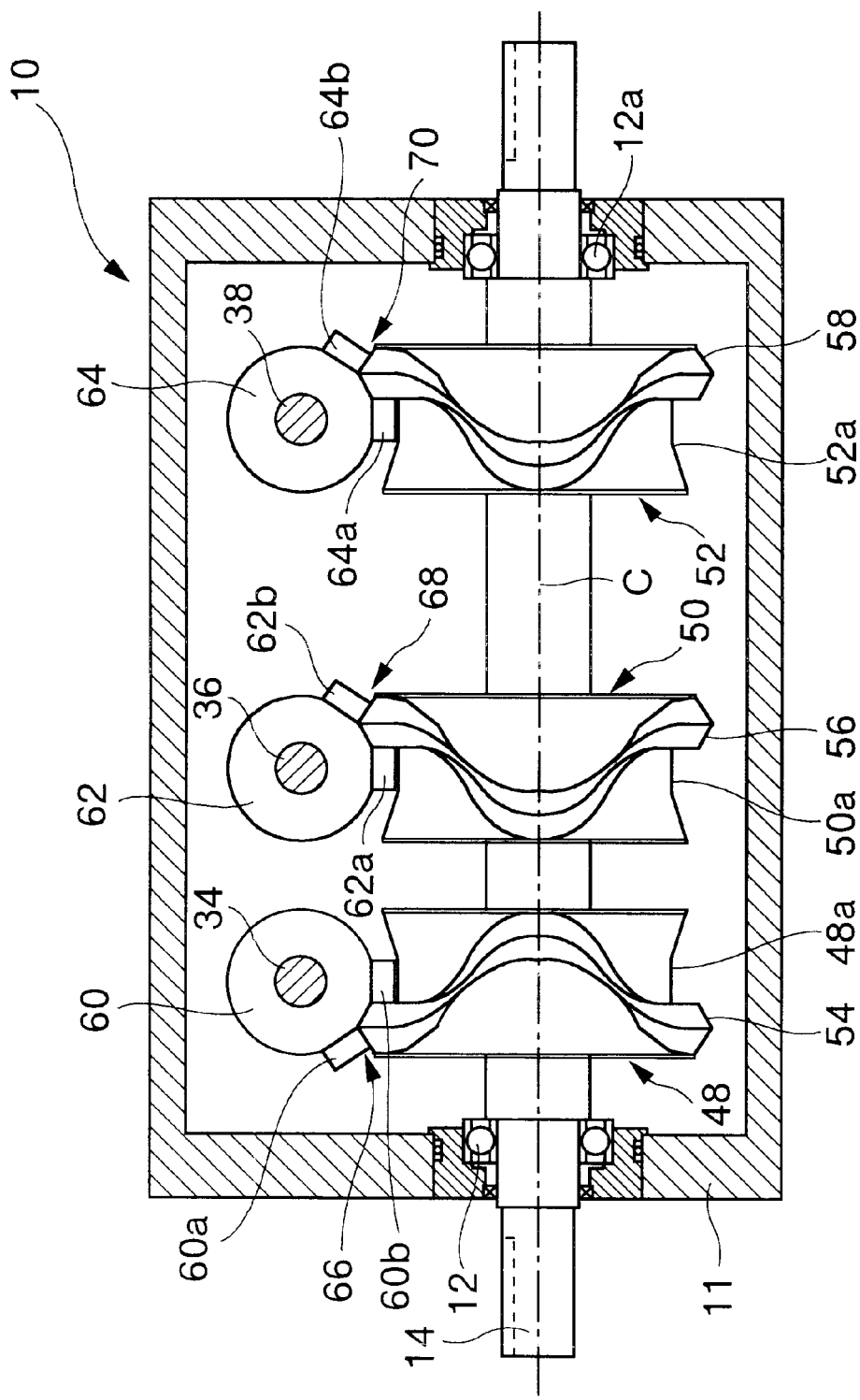
FIG. 2 is a sectional plan view of a two-dimensional motion producing apparatus of FIG. 1.

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscure the present invention.

A two-dimensional motion producing apparatus 10 according to the present embodiment is provided with a housing 11 formed in a box shape, as shown in FIGS. 1 to 4. An input shaft 14 is rotatably mounted on the housing 11 through bearings 12 and 12a, and a moving table 16 as an output member is arranged on the upper surface of the housing 11. The moving table 16 is two-dimensionally moved in an X-direction (vertical direction in FIG. 1) and in an Y-direction (lateral direction in FIG. 1) orthogonal thereto by rotation of the input shaft 14.

A guide block 18 is secured to an upper surface 11a of the housing 11, and the moving table 16 is placed relatively movably on a slide base surface 18a with the upper surface of the guide block 18 being the slide base surface 18a. A holding portion 18b folded back above the upper surface of the moving table 16 is formed in a peripheral edge portion of the guide block 18, and the peripheral edge portion of the moving table 16 is slidably sandwiched between the holding portion 18b and the slide base surface 18a so as to prevent the moving table 16 from being disengaged.

Figure 3:
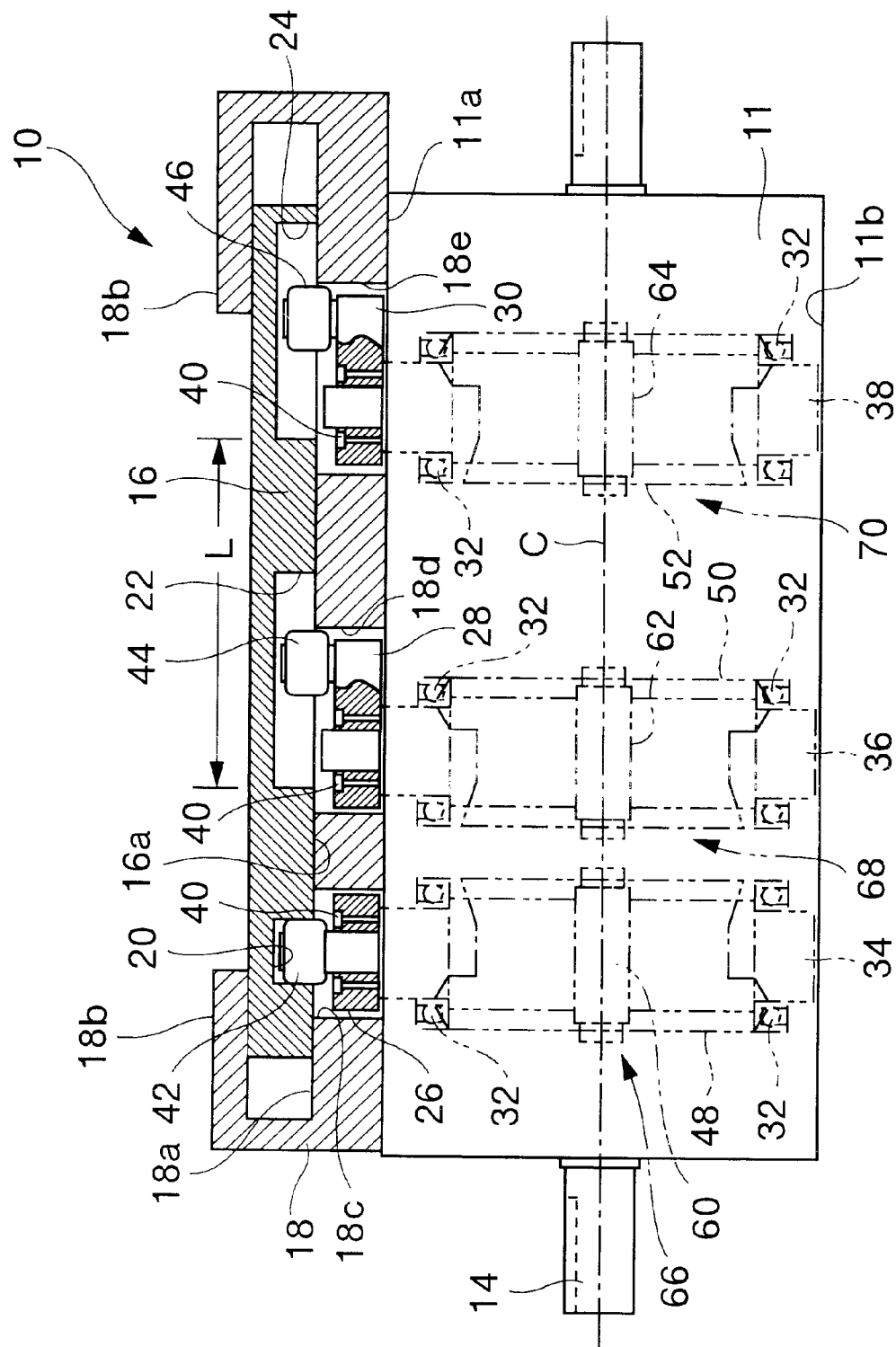
FIG. 3 is a sectional front view of a two-dimensional motion producing apparatus of FIG. 1.
Figure 4:
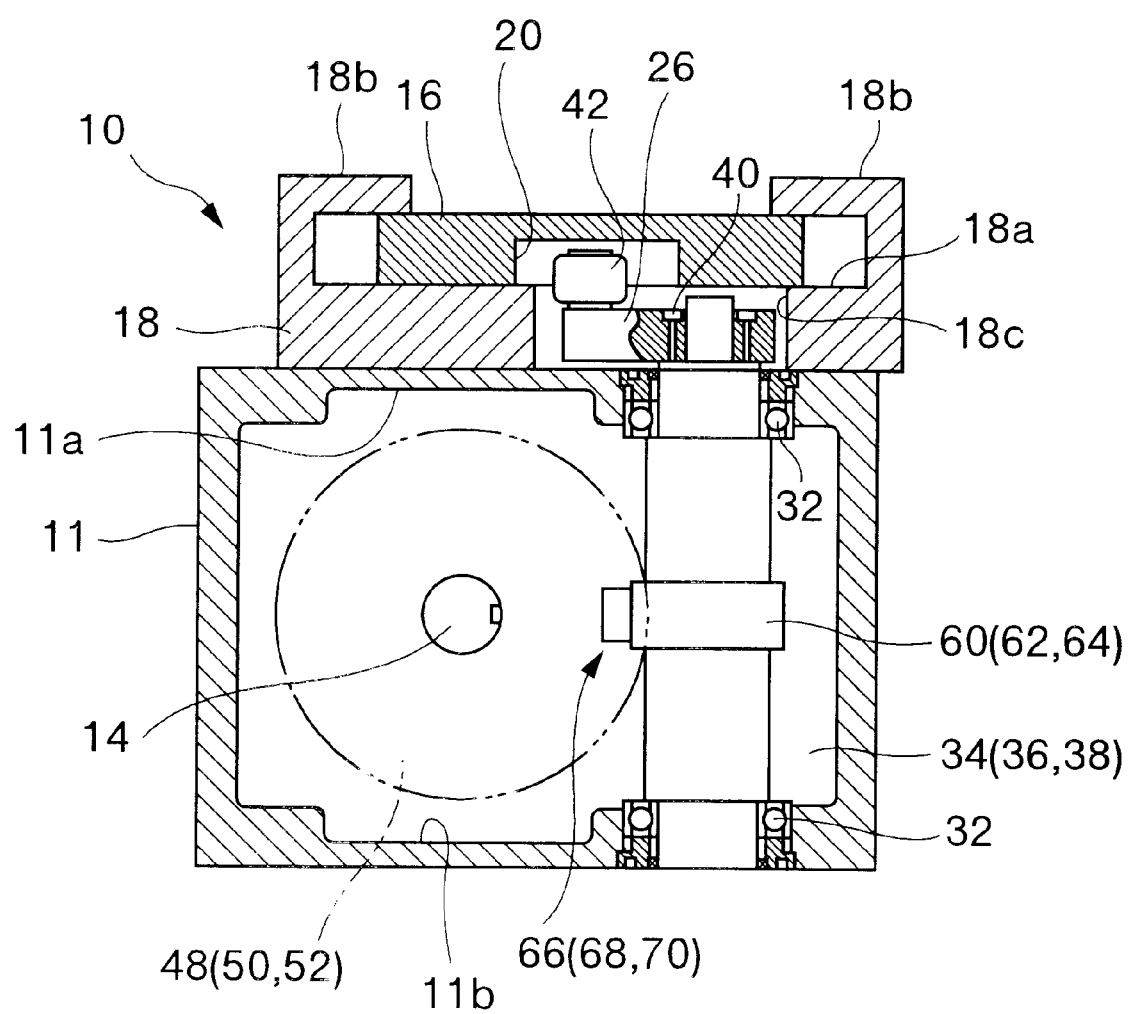
FIG. 4 is a sectional side view of a two-dimensional motion producing apparatus of FIG. 1.

The moving table 16 has a first guide groove 20 as a long groove in the X-direction in a lower surface 16a thereof at the left end in FIG. 3, and the moving table 16 also has a second guide groove 22 and a third guide groove 24 as long grooves, respectively in the Y-direction at suitable intervals L in the lower surface 16a thereof at the central portion and at the right end in the same figure.

The guide block 18 has openings 18c, 18d and 18e at positions corresponding to the first, second and third guide grooves 20, 22 and 24, and a first, a second and a third rocking arms 26, 28 and 30 are arranged in the openings 18c, 18d and 18e, respectively. The second and third rocking arms 28 and 30 are also spaced corresponding to the second and third guide grooves 22 and 24. The first, second and third rocking arms 26, 28 and 30 are mounted integrally rotatably on the upper ends of rotational shafts 34, 36 and 38 through screws 40. These rotational shafts 34, 36 and 38 are rotatably supported on the upper surface 11a and the lower surface 11b of the housing 11 through bearings 32.

Further, cam followers 42, 44 and 46 are rotatably mounted on the upper sides at the ends of the first, second and third rocking arms 26, 28 and 30, and the cam followers 42, 44 and 46 are slidably engaged with the first, second and third guide grooves 20, 22 and 24, respectively.

A first, a second and a third roller gear cams 48, 50 and 52 are integrally rotatably mounted on the input shaft 14 at positions corresponding to the rotational shafts 34, 36 and 38. The first, second and third roller gear cams 48, 50 and 52 are formed with taper ribs 54, 56 and 58 having a predetermined geometrical curve surface in outer peripheral surfaces 48a, 50a and 52a, respectively. A first, a second and a third follower turrets 60, 62, and 64 are mounted integrally rotatably on the rotational shafts 34, 36 and 38, respectively.

Pairs of cam followers 60a and 60b, 62a and 62b, and 64a and 64b are mounted at predetermined intervals on the first, second and third follower turrets 60, 62 and 64. These pairs of cam followers 60a and 60b, 62a and 62b, and 64a and 64b are engaged so as to sandwich both sides of the taper ribs 54, 56 and 58. The first roller gear cam 48 and the first follower turret 60 constitute a first rocking conversion mechanism 66, the second roller gear cam 50 and the second follower turret 62 constitute a second rocking conversion mechanism 68, and the third roller gear cam 52 and the third follower turret 64 constitute a third rocking conversion mechanism 70.

The second and third roller gear cams 50 and 52 are arranged so that the geometrical shapes of the taper ribs 56 and 58 thereof are formed in the same and the rotational phases thereof are in the same. The first roller gear cam 48 has the taper rib 54 formed with a geometrical shape different from those of the taper ribs 56 and 58 of the second and third roller gear cams 50 and 52.

In the two-dimensional motion producing apparatus 10 according to the present embodiment constructed as described above, when a rotational force is input into the input shaft 14, the first, second and third roller gear cams 48, 50 and 52 are synchronized and rotated together with the input shaft 14. Then, the cam followers 60a and 60b, 62a and 62b, and 64a and 64b engaged with the taper ribs 54, 56 and 58 of the roller gear cams 48, 50 and 52, respectively are oscillated rotationally along the direction of axis C of the input shaft 14 depending on the geometrical curves of the taper ribs 54, 56 and 58, so that the first, second and third follower turrets 60, 62 and 64 are oscillated rotationally. The rocking rotations of the first, second and third follower turrets 60, 62 and 64 are transmitted to the first, second and third rocking arms 26, 28 and 30 through the rotational shafts 34, 36 and 38 to oscillate rotationally the first, second and third rocking arms 26, 28 and 30.

Since the taper rib 54 of the first roller gear cam 48 is formed with the geometrical shape different from those of the taper ribs 56 and 58 of the second and third roller ear cams 50 and 52, the first rocking arm 26 is oscillated rotationally at a timing different from those of the second and third rocking arms 28 and 30. On the other hand, since the second and third roller gear cams 50 and 52 are arranged so that the geometrical shapes of the taper ribs 56 and 58 thereof are formed in the same and the their rotational phases are the same, the second and third rocking arms 28 and 30 are synchronized and oscillated rotationally at the same rotational angle.

Figure 5:
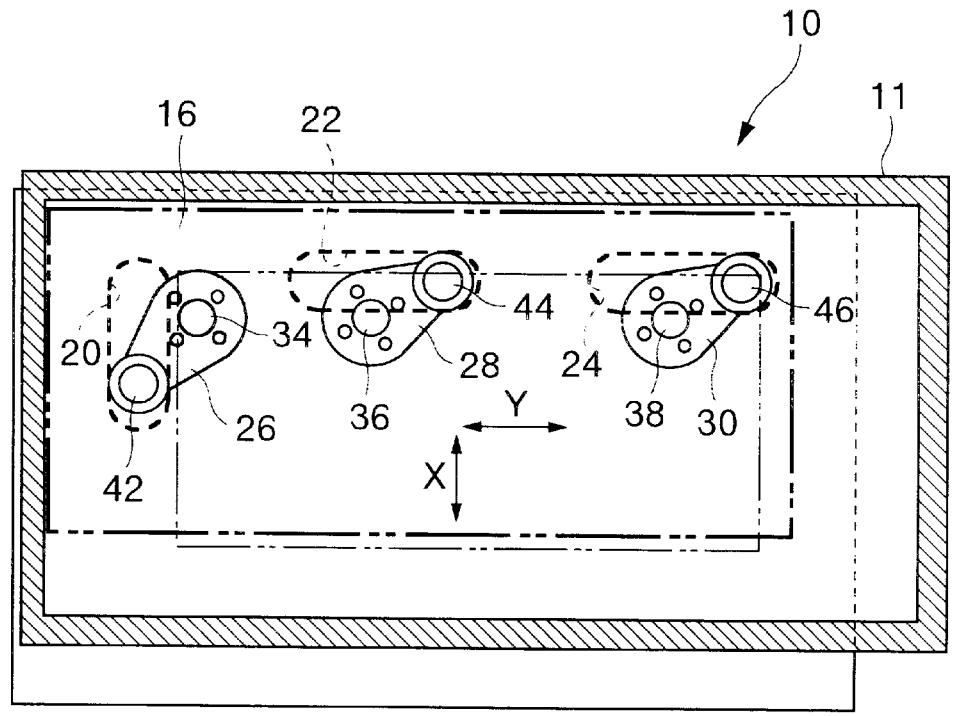
FIG. 5 is a plan view showing an initial state of a two-dimensional motion producing apparatus of FIG. 1.
Figure 6:
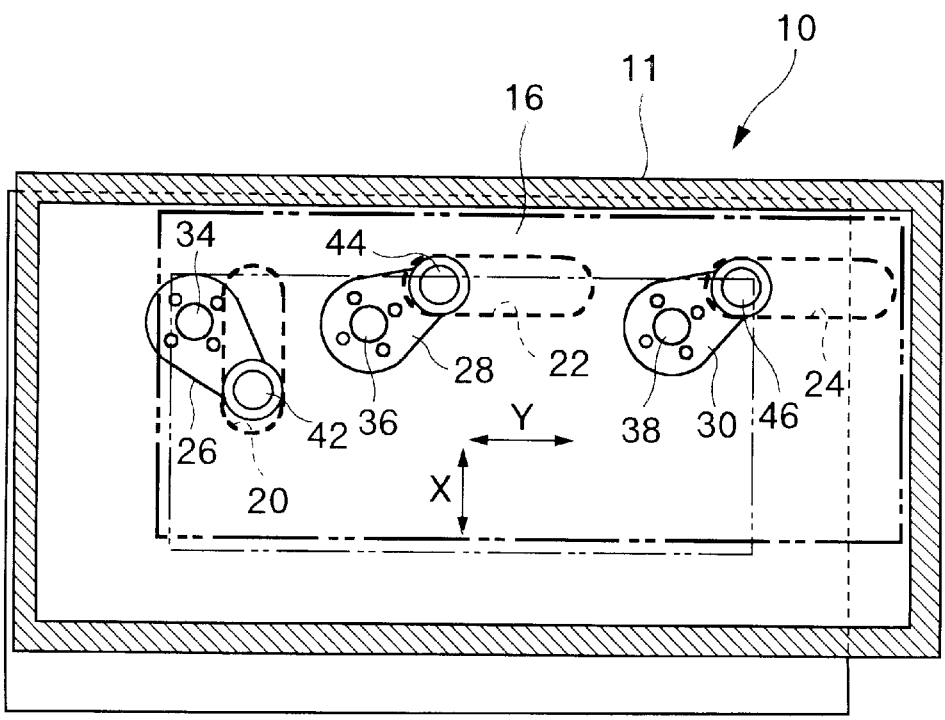
FIG. 6 is a plan view showing a moving state of an output member rightward in an Y-direction.

Accordingly, when the first rocking arm 26 is rotationally oscillated counterclockwise as shown in FIG. 6 from the initial state shown in FIG. 5, the cam follower 42 tends to move the moving table 16 on the slide base surface 18a through the first guide groove 20. Since the cam followers 44 and 46 of the second and third rocking arms 28 and 30 are respectively engaged with the second and third guide grooves 22 and 24, which are formed spaced apart from each other by distance L, the moving table 16 is controlled in its moving direction by the cam followers 44 and 46 in the second and third guide grooves 22 and 24, so that the moving table 16 moves linearly rightward in the figure, that is in the Y-direction where the second and third guide grooves 22 and 24 are elongated.

Figure 7:
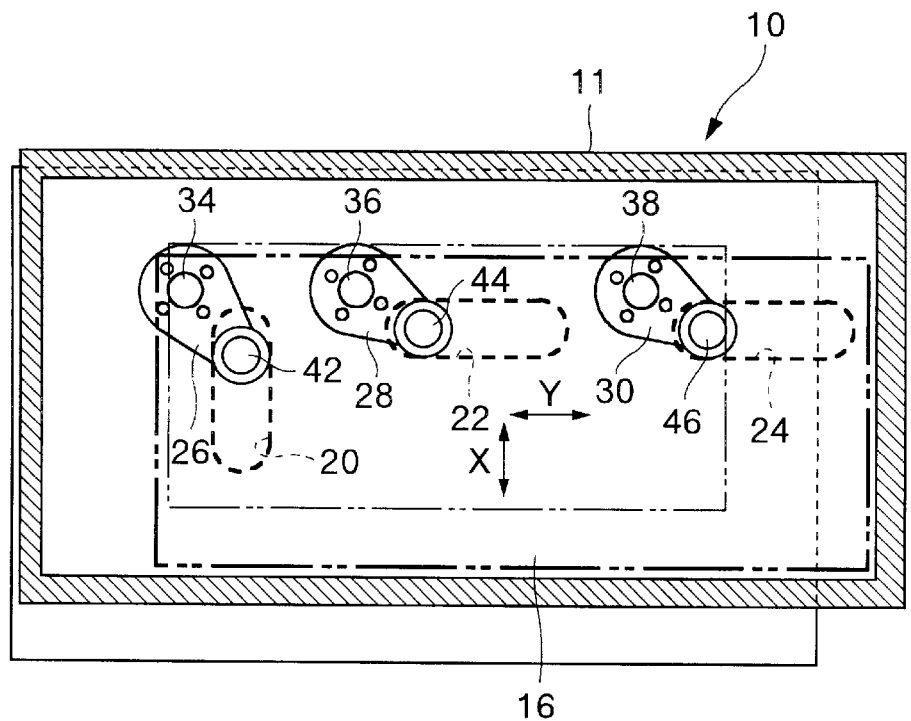
FIG. 7 is a plan view showing a moving state of an output member downward in an X-direction.

On the other hand, when the second and third rocking arms 28 and 30 are synchronized and oscillated rotationally clockwise as shown in FIG. 7 from the state shown in FIG. 6, the cam followers 44 and 46 tend to move the moving table 16 on the slide base surface 18a through the second and third guide grooves 22 and 24. Since the second and third rocking arms 28 and 30 are synchronized with each other at positions apart from each other by the distance L, and the cam follower 42 of the first rocking arm 26 is engaged with the first guide groove 20, the moving table 16 is controlled in its moving direction by the cam follower 42 in the first guide groove 20, so that the moving table 16 moves linearly downward in the figure, namely in the X-direction where the first guide groove 20 is elongated.

Figure 8:
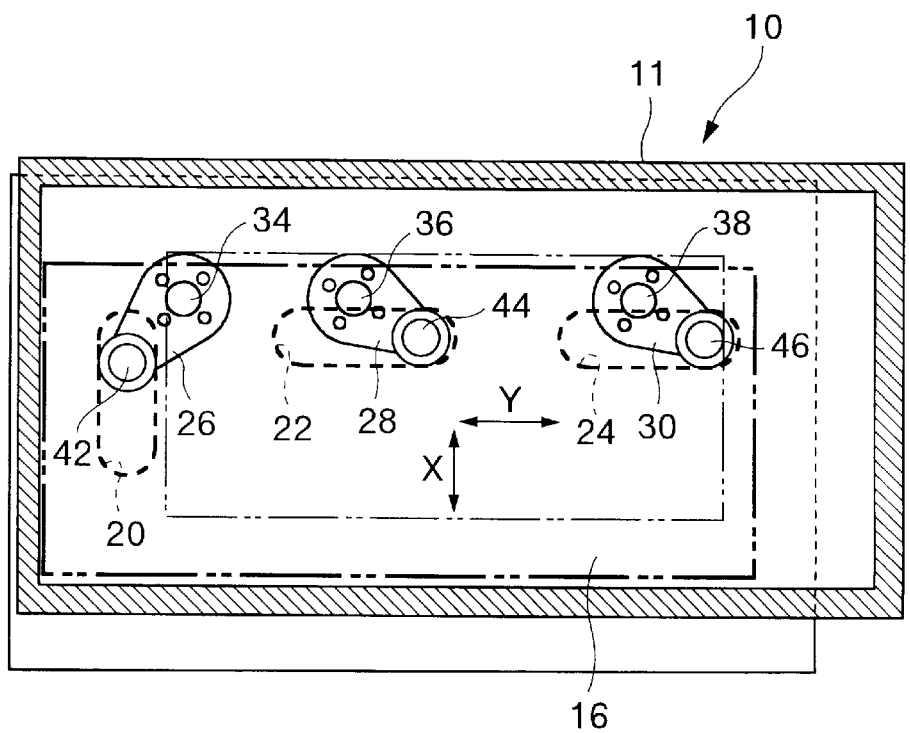
FIG. 8 is a plan view showing a moving state of an output member leftward in an Y-direction.
Figure 9:
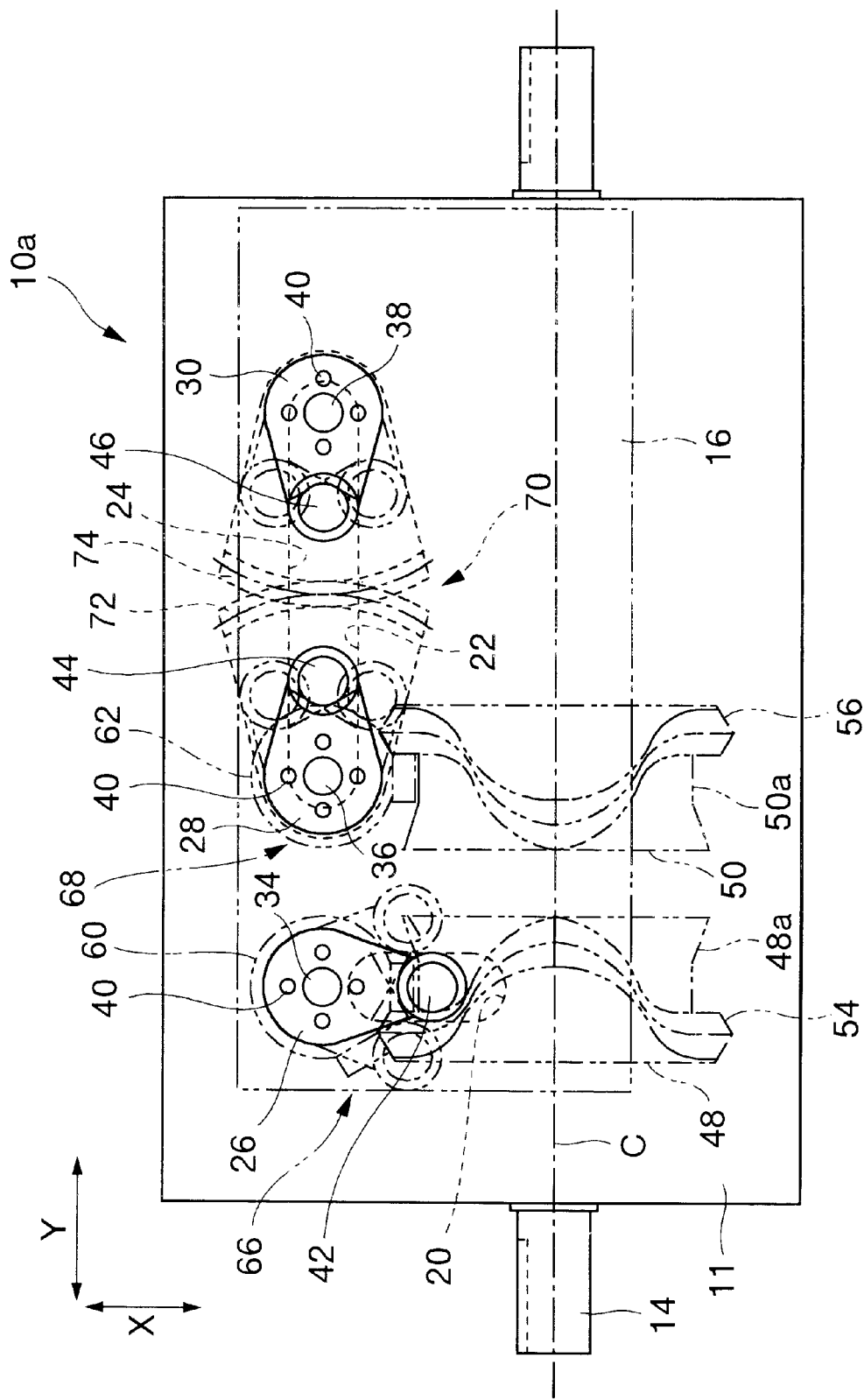
FIG. 9 is a plan view of a two-dimensional motion producing apparatus showing a further embodiment of the present invention.
Figure 10:
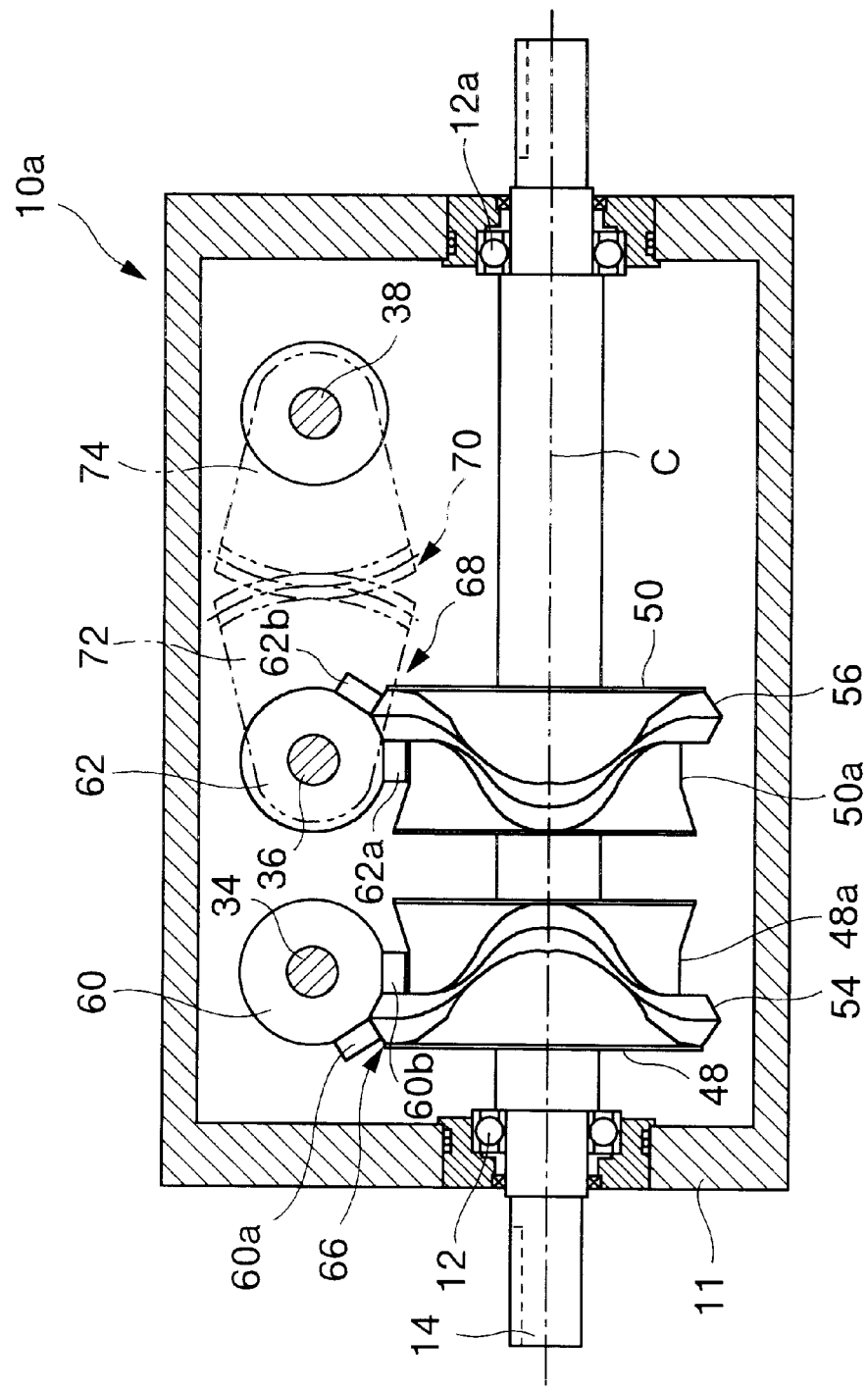
FIG. 10 is a sectional plan view of a two-dimensional motion producing apparatus of FIG. 9.
Figure 11:
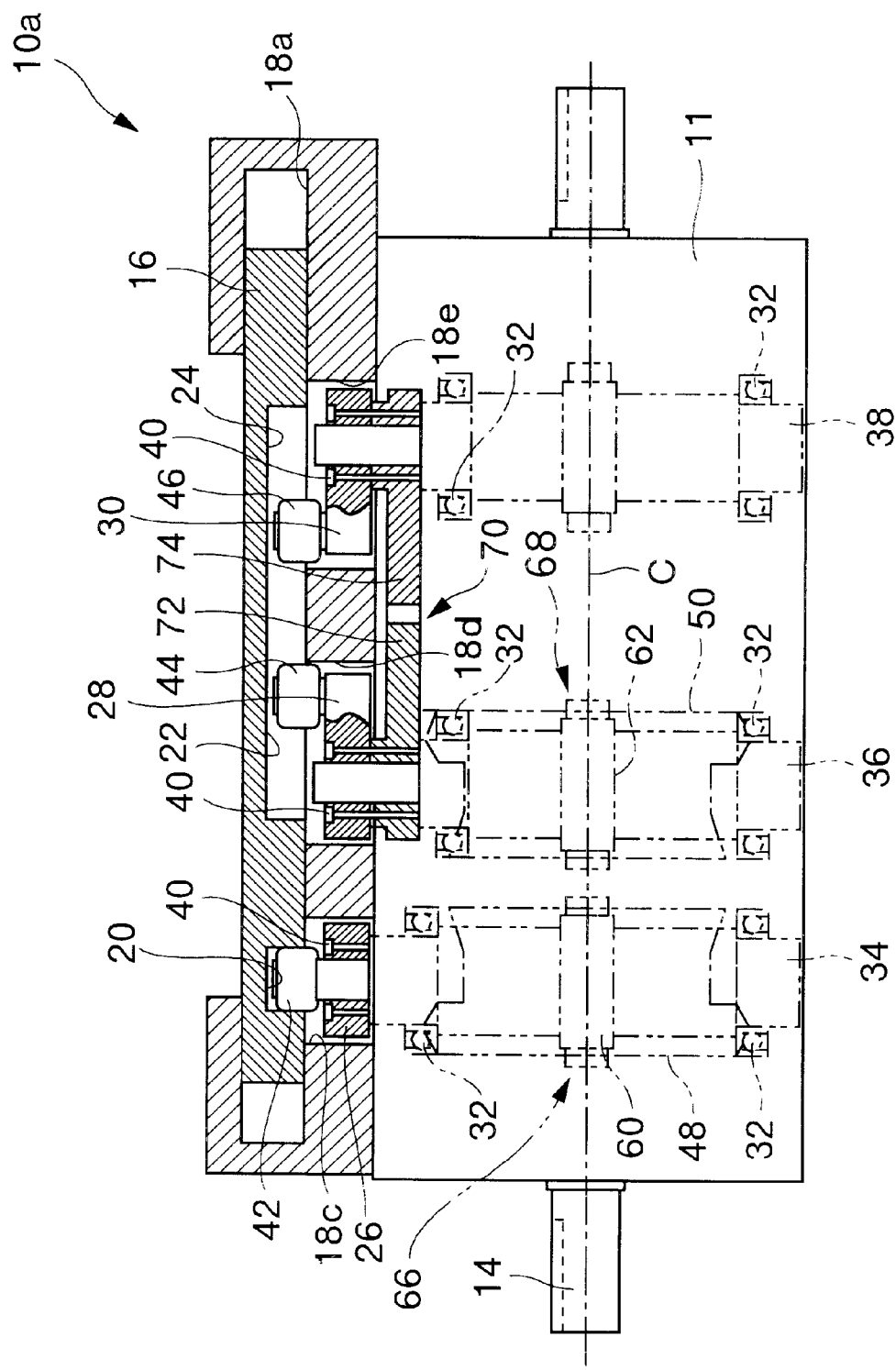
FIG. 11 is a sectional front view of a two-dimensional motion producing apparatus of FIG. 9.
Figure 12:
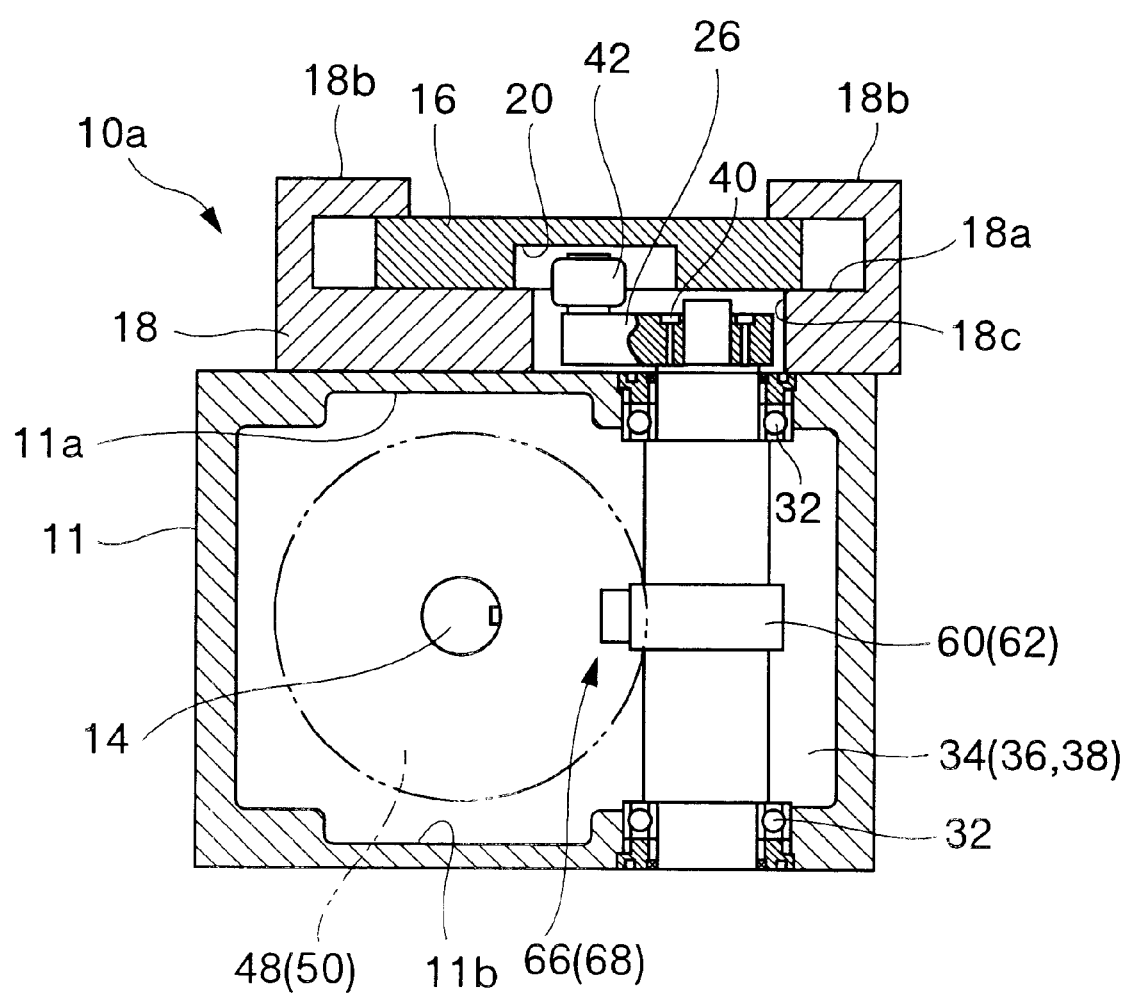
FIG. 12 is a sectional side view of a two-dimensional motion producing apparatus of FIG. 9.

Then, the first rocking arm 26 is oscillated rotationally clockwise as shown in FIG. 8 from the state shown in FIG. 7 whereby the moving table 16 is returned leftward in the Y-direction. The second and third rocking arms 28 and 30 are oscillated rotationally counterclockwise as shown in FIG. 5 from the state shown in FIG. 8 whereby the moving table 16 is returned upward in the X-direction and the moving table 16 is returned to its initial state.

Therefore, in the two-dimensional motion producing apparatus 10 according to the present embodiment, it is possible to produce the two-dimensional linear motion of the moving table 16 in the X-direction and in the Y-direction on the slide base surface 18a from the rotation of the single input shaft 14. Such a motion can be obtained by an extremely simple construction in which the cam followers 42, 44 and 46 of the first, second and third rocking arms 26, 28 and 30 are brought into direct engagement with the first, second and third guide grooves 20, 22 and 24 formed in the moving table 16 itself. Accordingly, the number of constituent parts for producing the motion can be reduced, whereby the durability of the two-dimensional motion producing apparatus 10 can be materially enhanced. As a result, a transmission torque introduced into the apparatus 10 can be increased, and the smooth operation can be secured to provide a higher-speed operation of the apparatus 10.

FIGS. 9 to 12 show a two-dimensional motion producing apparatus 10a according to a further embodiment of the present invention. The same constituent parts as those of the first mentioned embodiment are indicated by the same reference numerals, duplicate explanation of which is omitted.

In the two-dimensional motion producing apparatus 10a according to this embodiment, the rotation of the input shaft 14 is converted into the rocking rotation of the first, second and third rocking arms 26, 28 and 30 through the first, second and third rocking conversion mechanisms 66, 68 and 70, similar to the first mentioned embodiment. The first rocking conversion mechanism 66 and the second rocking conversion mechanism 68 are constituted by cam mechanisms provided with the first and second roller gear cams 48 and 50 and the first and second follower turrets 60 and 62 having the cam followers 60a and 60b, and 62a and 62b, similar to the first mentioned embodiment. However, the third rocking conversion mechanism 70 is constituted by a gear mechanism provided with a first gear 72 mounted integrally rotatably on the second rocking arm 28 and a second gear 74 mounted integrally rotatably on the third rocking arm 30. The second gear 74 is meshed with the first gear 72.

Accordingly, in the two-dimensional motion producing apparatus 10a according to this embodiment, the rotation of the input shaft 14 is converted into the rocking rotation of the first and second rocking arms 26 and 28 through the first and second roller gear cams 48 and 50 and the first and second follower turrets 60 and 62. On the other hand, since the third rocking conversion mechanism 70 is constituted by the first gear 74 and the second gear 74, the rocking rotation of the second rocking arm 28 is transmitted to the third rocking arm 30 through the first and second gears 72 and 74 meshed with each other. In the present embodiment, the first and second gears 72 and 74 are formed in a fan-shape. These gears 72 and 74 are formed in the smallest size capable of transmitting the rotational angle necessary for the rocking rotation.

Incidentally, the second and third rocking arms 28 and 30 are oscillated rotationally in the reverse direction with each other, however, the second and third rocking arms 28 and 30 are rotated in synchronism with each other, so that the moving table 16 can be moved linearly in the X-direction and in the Y-direction with a parallel state.

While in the above-described embodiment shown in FIGS. 1 to 8, the guide grooves 22 and 24 are formed separately with each other. It is to be noted that both of the guide grooves 22 and 24 may be formed continuously as shown in the present embodiment.

In the present embodiment, the two-dimensional motion producing apparatus 10a can be further simplified in construction by a composition of the cam mechanism and the gear mechanism.

As described above, in the two-dimensional motion producing apparatus according to the present invention, the rotation of the input shaft is converted into the rocking motion of the first, second and third rocking arms through the first, second and third rocking conversion mechanisms, the engaging member of the first rocking arm is engaged with the first guide groove elongated in the X-direction of the output member, and the engaging members of the second and third rocking arms are engaged with the second and third guide grooves elongated in the Y-direction with spaced from each other in the output member, whereby the two-dimensional linear motion of the output member on the slide base surface in the X-direction and in the Y-direction from the rotation of the single input shaft can be produced. Such a motion can be obtained by an extremely simple construction in which the engaging members of the first, second and third rocking arms are directly engaged with the first, second and third guide grooves formed in the output member itself. Accordingly, the number of constituent parts for producing the motion can be reduced, whereby the durability of the two-dimensional motion producing apparatus can be materially enhanced. As a result, a transmission torque introduced into the apparatus can be increased, and the smooth operation can be secured to provide a higher-speed operation of the apparatus.

Further, the first, second and third rocking conversion mechanisms can be simplified by application of the cam mechanism, and the durability of the two-dimensional motion producing apparatus can be further enhanced by the smooth operation served by the cam mechanism.

Moreover, the two-dimensional motion producing apparatus can be further simplified in construction by a composition of the cam mechanism and the gear mechanism.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A two-dimensional motion producing apparatus, comprising:
    an input shaft into which a rotation force is input;
    an output member provided movably in a two-dimensional direction consisting of an X-direction and an Y-direction orthogonal thereto on a slide base surface;
    a first guide groove elongated in the X-direction on said output member;
    second and third guide grooves elongated in the Y-direction spaced apart from each other on said output member;
    first, second and third rocking arms engaged in said first guide groove and said second and third guide grooves respectively through engaging members;
    a first rocking conversion mechanism for converting the rotation of said input shaft into a rocking motion of said first rocking arm; and
    second and third rocking conversion mechanisms for converting the rotation of said input shaft into rocking motions in synchronism with each other of said second and third rocking arms.

2. The two-dimensional motion producing apparatus according to claim 1, wherein said second and third guide grooves are formed continuously in series with each other.

3. The two-dimensional motion producing apparatus according to claim 1, wherein said first rocking conversion mechanism, and said second and third rocking conversion mechanisms are constituted by cam mechanisms comprising a first, a second and a third roller gear cams provided integrally rotatably on said input shaft and said first, second, and third roller gear cams each formed in its outer peripheral surface with a taper rib having a predetermined geometrical curve, and a first, a second and a third follower turrets engaged with said taper ribs of said first, second and third roller gear cams through cam followers.

4. The two-dimensional motion producing apparatus according to claim 3, wherein for rocking and rotating said first rocking arm, and said second and third rocking arms at different timings from each other, said taper rib of said first roller gear cam is formed in a different geometrical shape from those of said taper ribs of said second and third roller gear cams, and for rocking and rotating said second and third rocking arms in synchronism with each other and at the same rotational angle, said taper ribs of said second and third roller gear cams are arranged in the same geometrical shape and at the same rotational phase.

5. The two-dimensional motion producing apparatus according to claim 1, wherein said first rocking conversion mechanism, and one of said second and third rocking conversion mechanisms are constituted by cam mechanisms comprising a first and a second roller gear cams provided integrally rotatably on said input shaft and each formed in its outer peripheral surface with a taper rib having a predetermined geometrical curve, and a first and a second follower turrets engaged with said taper ribs of said first and second roller gear cams through cam followers, whereas the other of said second and third rocking conversion mechanisms is constituted by a gear mechanism in which a first and a second gears provided integrally rotatably on said second and third rocking arms are meshed with each other.

6. The two-dimensional motion producing apparatus according to claim 5, wherein said first and second gears are formed in a fan-shape with the smallest size capable of transmitting a rotational angle necessary for rocking rotation.

7. A two-dimensional motion producing apparatus, comprising:
    an input shaft into which a rotation force is input;
    an output member provided movably in a two-dimensional direction consisting of an X-direction and an Y-direction orthogonal thereto on a slide base surface;
    a first guide groove elongated in the X-direction on said output member;
    second and third guide grooves elongated in the Y-direction spaced apart from each other on said output member;
    first, second and third rocking arms engaged in said first guide groove and said second and third guide grooves respectively through engaging members;
    a first rocking conversion mechanism for converting the rotation of said input shaft into a rocking motion of said first rocking arm; and
    second and third rocking conversion mechanisms for converting the rotation of said input shaft into rocking motions in synchronism with each other of said second and third rocking arms;

wherein said first rocking conversion mechanism, and said second and third rocking conversion mechanisms are constituted by cam mechanisms comprising a first, a second and a third roller gear cams provided integrally rotatably on said input shaft and each said first, second, and third roller gear cams formed in its outer peripheral surface with a taper rib having a predetermined geometrical curve, and first, second and a third follower turrets engaged with said taper ribs of said first, second and third roller gear cams through cam followers, and, for rocking and rotating said first rocking arm, and said second and third rocking arms at different timings from each other, said taper rib of said first roller gear cam is formed in a different geometrical shape from those of said taper ribs of said second and third roller gear cams, and for rocking and rotating said second and third rocking arms in synchronism with each other and at the same rotational angle, said taper ribs of said second and third roller gear cams are arranged in the same geometrical shape and at the same rotational phase.

* * * * *